(12) United States Patent
Feicha et al.

(10) Patent No.: US 9,688,098 B2
(45) Date of Patent: Jun. 27, 2017

(54) WHEEL HUB COVER ARRANGEMENT AND WHEEL HUB FOR A MOTOR VEHICLE

(71) Applicant: Dr. Ing. h.c. F. Porsche Aktiengesellschaft, Stuttgart (DE)

(72) Inventors: Friedrich Feicha, Ravensburg (DE); Dietmar Becker, Tamm (DE); Konstantin Kirsch, Sindelfingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 83 days.

(21) Appl. No.: 14/295,746

(22) Filed: Jun. 4, 2014

(65) Prior Publication Data

US 2014/0361605 A1  Dec. 11, 2014

(30) Foreign Application Priority Data

Jun. 6, 2013  (DE) ......................... 10 2013 105 834

(51) Int. Cl.
| | | |
|---|---|---|
| *B60B 7/04* | (2006.01) | |
| *B60B 7/14* | (2006.01) | |
| *B60B 7/00* | (2006.01) | |
| *B60B 27/00* | (2006.01) | |

(52) U.S. Cl.
CPC ............... *B60B 7/002* (2013.01); *B60B 7/04* (2013.01); *B60B 7/14* (2013.01); *B60B 27/00* (2013.01); *B60B 2310/318* (2013.01); *B60B 2900/211* (2013.01)

(58) Field of Classification Search
CPC  B60B 7/002; B60B 7/04; B60B 7/066; B60B 7/14; B60B 2310/318; B60B 2900/211
See application file for complete search history.

(56) References Cited

U.S. PATENT DOCUMENTS

| | | | | |
|---|---|---|---|---|
| 3,785,706 A | * | 1/1974 | Vangalis | ................. B60B 27/02 184/45.1 |
| 4,040,672 A | | 8/1977 | Imahashi | |
| 5,104,202 A | * | 4/1992 | Branch | ................. B60B 7/0013 301/108.1 |

(Continued)

FOREIGN PATENT DOCUMENTS

DE  8326027 U1  2/1984

OTHER PUBLICATIONS

German Search Report, dated Jan. 27, 2014, corresponding to counterpart German Patent Application No. 10 2013 105 834.5, with partial English translation.

*Primary Examiner* — Frank Vanaman
(74) *Attorney, Agent, or Firm* — RatnerPrestia

(57) ABSTRACT

A wheel hub cover arrangement for covering an outwardly directed wheel hub opening of a wheel hub, which has a cover surface element which is connected to the wheel hub via a wall member and a connection member in such a way that the cover surface element and the wall member enclose a cover volume, wherein at least one venting opening for venting and for pressure-equalizing a vehicle shaft connected to the wheel hub is provided, wherein at least one outlet opening for removing splash water from the cover volume is provided in the wall member, wherein provisions are provided which ensure a fluid connection of the outlet opening with the surroundings of the wall member.

14 Claims, 3 Drawing Sheets

(56) References Cited

U.S. PATENT DOCUMENTS

| | | | | |
|---|---|---|---|---|
| 5,195,807 | A | * | 3/1993 | Lederman ............... B60B 7/002 |
| | | | | 301/108.1 |
| 5,752,746 | A | * | 5/1998 | Perry ...................... B60B 7/002 |
| | | | | 301/108.1 |
| 5,785,390 | A | | 7/1998 | Gold et al. |
| 5,860,708 | A | * | 1/1999 | Borders .................. B60B 7/002 |
| | | | | 301/108.1 |
| 6,394,159 | B1 | * | 5/2002 | Cobb ..................... B60C 23/003 |
| | | | | 152/416 |
| 6,758,531 | B1 | | 7/2004 | Bullard |
| 6,783,191 | B1 | | 8/2004 | Slesinski et al. |
| 7,156,890 | B1 | * | 1/2007 | Thompson ......... B01D 46/0005 |
| | | | | 301/108.1 |
| 7,314,256 | B1 | | 1/2008 | Haines |
| 2013/0020855 | A1 | | 1/2013 | Becker et al. |

* cited by examiner

WHEEL HUB COVER ARRANGEMENT AND WHEEL HUB FOR A MOTOR VEHICLE

CROSS-REFERENCE TO RELATED APPLICATIONS

This application claims priority to German Patent Application No. 10 2013 105 834.5, filed Jun. 6, 2013, which is incorporated by reference herein in its entirety.

FIELD OF THE INVENTION

The invention relates to a wheel hub cover arrangement for covering an outwardly directed wheel hub opening of a wheel hub, which has a cover surface element which is connected to the wheel hub via a wall element and a connection member in such a way that the cover surface element and the wall member enclose a cover volume, wherein at least one venting opening for venting and for pressure-equalizing a vehicle shaft connected to the wheel hub is provided. Moreover, the invention relates to a wheel hub for a motor vehicle having such a wheel hub cover arrangement.

BACKGROUND OF THE INVENTION

Such a wheel hub cover arrangement is known, for example, from U.S. Pat. No. 5,785,390, which is incorporated by reference herein. In order to be able to vent a vehicle shaft connected to the wheel hub and carry out pressure equalization, a venting bore is provided which is connected to the atmosphere via further openings in a closure part. In order to prevent splash water or dirt from penetrating into the wheel hub, a membrane is provided between the venting bore and the further openings, which membrane is intended to protect the cover volume from the ingress of undesired contaminants. Such an arrangement is very complicated to assemble and thus also expensive to manufacture. Moreover, a closure element exposed in such a way is not desired for design reasons.

SUMMARY OF THE INVENTION

Disclosed herein is a wheel hub cover arrangement in that at least one outlet opening for removing splash water from the cover volume is provided in the wall member, wherein means are provided which ensure a fluid connection of the outlet opening with the surroundings of the wall member. Through the simple provision of outlet openings, which, of course, at the same time also serve for venting and for pressure equalization, the arrangement of a membrane can be avoided. As a result of the centrifugal force during driving operation, splash water which has entered the cover volume can be forced out of the cover volume. In addition, owing to the arrangement of outlet openings in the wall member, the cover volume is substantially better protected from penetration of dirty water and splash water, in particular when the cover surface element has a larger diameter than the cover volume. A further advantage is that the cover surface element can be manufactured free of openings and is therefore not subject to any restrictions in terms of design. A particularly advantageous embodiment is obtained when at least three outlet openings are provided which are arranged at a uniform distance in the circumferential direction in the wall member. As a result, the splash water can be removed from the cover volume even with the vehicle at a standstill, i.e. in any position of the wheel hub.

From an assembly point of view, it can be advantageous if an intermediate cover element directed toward the wheel hub is provided which has the venting opening.

In order to ensure a fluid connection with the surroundings, it is advantageous when a clearance is provided in the cover surface element in the region of the outlet opening. Alternatively, it is possible for at least one spacer member to be provided in such a way that the cover surface element is arranged at a defined distance from the wheel hub. It is advantageous here if the outlet opening is provided as an outlet bore in the spacer member. In an advantageous manner, the spacer member can have an annular design.

A particularly simple arrangement of the wheel hub cover arrangement can be ensured in that the connection member is designed as a thread. For additional protection against the penetration of splash water, the wall member can have a seal.

Also disclosed herein is a wheel hub for a motor vehicle having such a wheel hub cover arrangement in that a receiving member is provided which is in operative connection with the connection member. Here, it is advantageous if the connection member is arranged in a secured manner, for example by means of an adhesive, in the receiving member.

BRIEF DESCRIPTION OF THE DRAWING

The invention will be explained in more detail below by means of a drawing, in which.

DETAILED DESCRIPTION OF THE INVENTION

Figure 1:
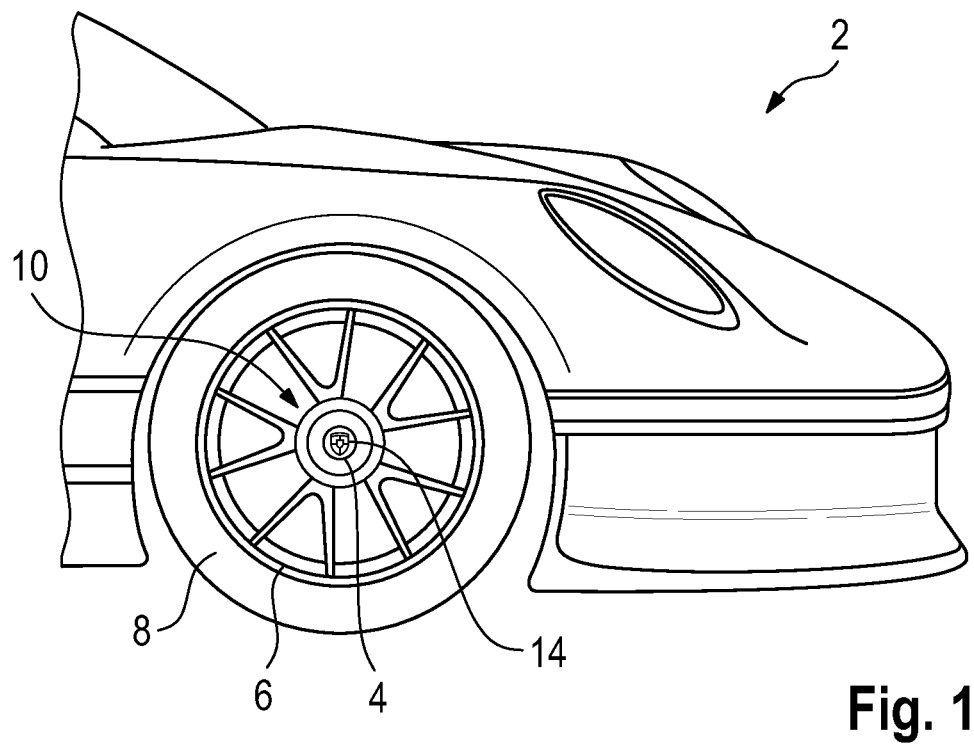
FIG. 1 shows a side view of a front part of a motor vehicle.

FIG. 1 is a side view showing the front side of a motor vehicle 2. In a known manner, a rim 6 with a tire 8 is arranged on a wheel hub 4. The wheel hub 4 is closed by a wheel hub cover arrangement 10. A cover surface element 12 (see in this respect FIG. 2) has, in a known manner, a logo or symbol 14 of a motor vehicle manufacturer.

Figure 2:
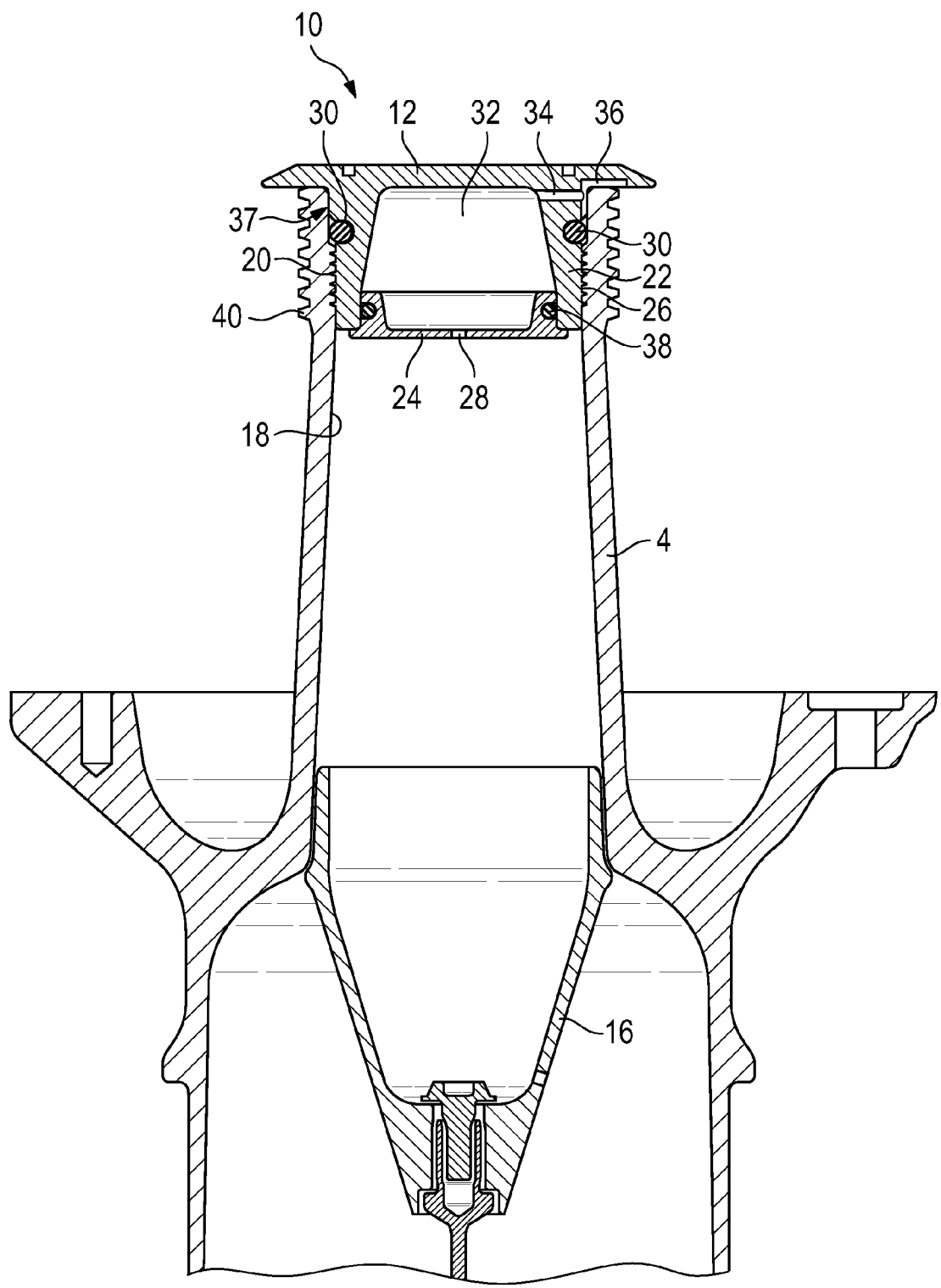
FIG. 2 shows a perspective sectional view of a wheel hub, arranged on a drive shaft, having a wheel hub cover arrangement.

FIG. 2 is a perspective sectional view showing a vehicle shaft 16 which is designed as a drive shaft and on which the wheel hub 4 is arranged in a known manner. The wheel hub 4 has an outwardly directed wheel hub opening 18 which has an internal thread as receiving member 20. A wheel hub nut (not shown) for fixing a wheel on the wheel hub 4 is mounted on an external thread 40 of the wheel hub opening 18. The wheel hub cover arrangement 10 is inserted into the wheel hub opening 18. The wheel hub cover arrangement 10 has the wheel hub cover surface element 12 and also a wall member 22 and an intermediate cover element 24. The wall member 22 has an encircling external thread 26 as connection member which is in operative connection with the internal thread 20 of the wheel hub 4. The intermediate cover element 24 has a centrally arranged venting opening 28. Furthermore, a seal 30 is indicated by means of which the wheel hub cover arrangement 10 is arranged in a sealed manner in the wheel hub opening 18 of the wheel hub 4. The cover surface element 12 and the wall member 22 enclose a cover volume 32 into which splash water can enter via the venting or pressure-equalizing function.

Figure 3:
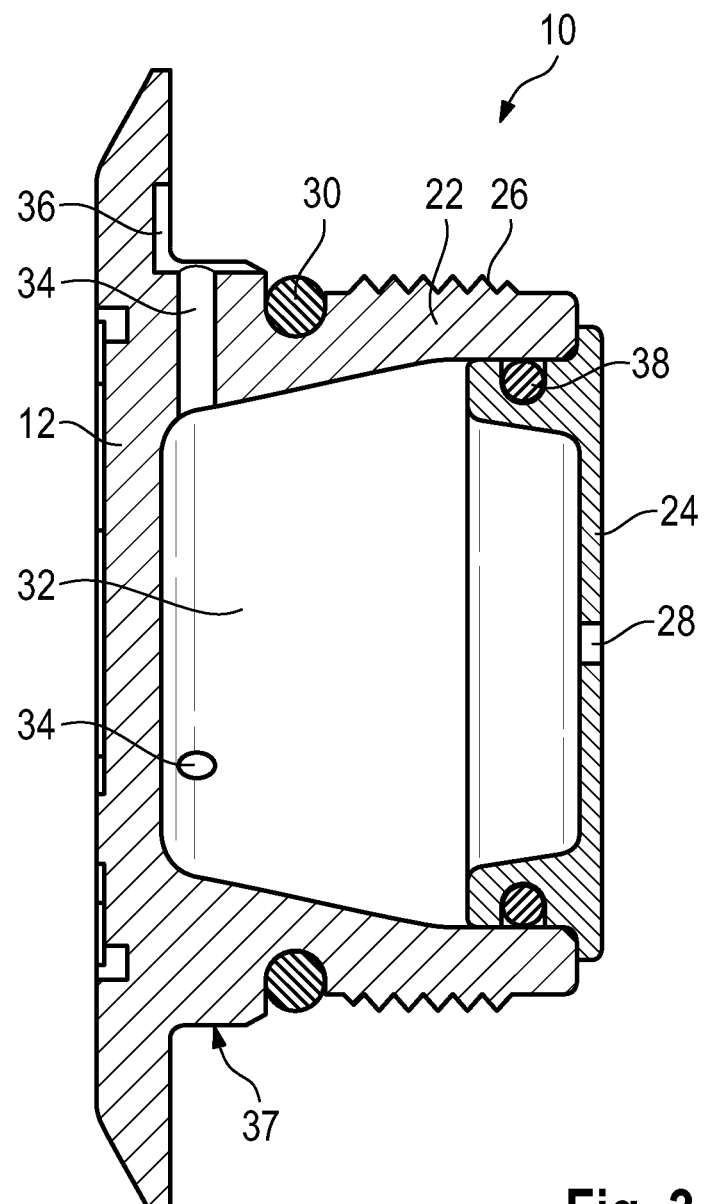
FIG. 3 shows a sectional view of the wheel hub cover arrangement according to aspects of the invention from FIG. 2.

FIG. 3 then shows the wheel hub cover arrangement 10 according to aspects of the invention in a sectional view.

In order to be able to remove this splash water and thus prevent any corrosion of the wheel hub cover arrangement 10, there are provided in the present exemplary embodiment three outlet openings 34 which are designed as outlet bores, of which, however, only two are represented here. These outlet bores 34 are distributed at a uniform distance, here 120°, over the circumference of the wall member 22. Clearances 36 are in each case provided in the region of the outlet bores 34, with the result that a fluid connection of the outlet openings 34 with the surroundings of the wall member 22 is ensured. These clearances 36 refer only to the immediate surroundings of the outlet bores 34. In the remainder of the circumference of the wall member there is formed a fitting surface 37 which forms a fit with the wheel hub opening 18 so that the wheel hub 4 can bend when subjected to external forces. Furthermore, the diameter of the cover surface element 12 is greater than the diameter of the wall member 22 and also greater than the diameter of the annular spacer member, with the result that the outlet bores extend in a protected manner behind the cover surface element 12. The intermediate cover element 24 is pressed into the wall member 22 with the aid of a second seal 38.

In order to avoid an unwanted detachment of the wheel hub cover arrangement 10, an adhesive can be provided between the external thread 26 and the internal thread 20.

Moreover, it should be clear that the connection of the wheel hub cover arrangement 10 to the wheel hub opening 18 of the wheel hub 4 can be implemented in a variety of ways, for example also by means of pin connections.

It is also conceivable to provide a spacer member in such a way that the cover surface element 12 is arranged at a defined distance from the wheel hub 4. In this case, the outlet openings 34 can be provided in the spacer member, which advantageously has an annular design.

Moreover, the wheel hub cover 12 serves as a securing means for the aforementioned wheel hub nut for fixing a wheel on the wheel hub 4. The external thread 40 for the wheel hub nut and the internal thread 20 are designed to run in opposite directions, with the result that unwanted detachment of the wheel hub nut is prevented. The wheel hub cover 12 thus serves, on the one hand, for removing splash water and, on the other hand, as a securing means for the wheel hub nut for fixing a wheel on the wheel hub 4. The formation of the fitting surface 37 produces a fit between the wheel hub opening and the wheel hub cover 12, which fit gives the wheel hub 4 more stability, with the result that the wheel hub 4 also does not bend under the influence of external forces.

What is claimed:

1. A wheel hub cover arrangement for covering an outwardly directed wheel hub opening of a wheel hub, wherein the wheel hub cover arrangement comprises:
    a cover surface element which is connected to the wheel hub opening via a wall member and a connection member in such a way that the cover surface element and the wall member enclose a cover volume, the wall member extending into the wheel hub opening,
    at least one venting opening for venting and for pressure-equalizing a vehicle shaft connected to the wheel hub,
    at least one outlet opening comprising a bore passing through an entire thickness of the wall member to connect the cover volume with the surroundings of the wall member for removing splash water from the cover volume,
    a recess defined in the wall member and the cover surface element, the recess being in fluid communication with the at least one outlet opening to fluidly connect the outlet opening with the surroundings of the wall member,
    wherein the cover surface element includes a contact surface contacting the wheel hub, and the recess is at least partially disposed on the contact surface of the cover surface element so as to form a clearance space between the contact surface of the cover surface element and the wheel hub.

2. The wheel hub cover arrangement as claimed in claim 1, further comprising at least three of the outlet openings, wherein the at least three outlet openings are arranged at a uniform distance in a circumferential direction in the wall member.

3. The wheel hub cover arrangement as claimed in claim 1, wherein an intermediate cover element directed toward the wheel hub is provided which has the venting opening.

4. The wheel hub cover arrangement as claimed in claim 1, wherein the recess is provided in the cover surface element in a region of the outlet opening.

5. The wheel hub cover arrangement as claimed in claim 1, wherein at least one spacer member is provided in such a way that the cover surface element is arranged at a defined distance from the wheel hub.

6. The wheel hub cover arrangement as claimed in claim 5, wherein the outlet opening is provided in the spacer member.

7. The wheel hub cover arrangement as claimed in claim 5, wherein the spacer member has an annular design.

8. The wheel hub cover arrangement as claimed in claim 1, wherein the connection member is a thread.

9. The wheel hub cover arrangement as claimed in claim 1, wherein the wall member has a seal.

10. A wheel hub for a motor vehicle having a wheel hub cover arrangement as claimed in claim 1, wherein a receiving member is provided which is in operative connection with the connection member.

11. The wheel hub as claimed in claim 10, wherein the connection member is arranged in a secured manner in the receiving member.

12. The wheel hub as claimed in claim 11, wherein the connection member is arranged in the receiving member by an adhesive.

13. The wheel hub cover arrangement as claimed in claim 1, wherein the recess and the outlet opening each extend in radial directions.

14. The wheel hub cover arrangement as claimed in claim 1, wherein the recess extends from the outlet opening on the wheel hub cover arrangement.

* * * * *